United States Patent
Nielsen

(10) Patent No.: US 8,899,453 B2
(45) Date of Patent: Dec. 2, 2014

(54) DISPENSING DEVICE FOR DISPENSING A LIQUID PRODUCT

(75) Inventor: Keld Krogh Nielsen, Graasten (DK)

(73) Assignee: Logidos ApS, Aabenraa (DK)

( * ) Notice: Subject to any disclaimer, the term of this patent is extended or adjusted under 35 U.S.C. 154(b) by 0 days.

(21) Appl. No.: 13/695,671

(22) PCT Filed: May 3, 2011

(86) PCT No.: PCT/DK2011/000039
§ 371 (c)(1),
(2), (4) Date: Nov. 1, 2012

(87) PCT Pub. No.: WO2011/137900
PCT Pub. Date: Nov. 10, 2011

(65) Prior Publication Data
US 2013/0134191 A1 May 30, 2013

(30) Foreign Application Priority Data
May 5, 2010 (DK) ................................. 2010 00392

(51) Int. Cl.
| | | |
|---|---|---|
| G01F 11/26 | (2006.01) | |
| B29C 45/00 | (2006.01) | |
| B65D 47/06 | (2006.01) | |
| B65D 47/08 | (2006.01) | |
| B65D 83/06 | (2006.01) | |
| B29C 45/37 | (2006.01) | |

(52) U.S. Cl.
CPC ............. *G01F 11/262* (2013.01); *B65D 47/06* (2013.01); *B65D 47/08* (2013.01); *B65D 83/06* (2013.01); *B29C 45/376* (2013.01); *B29C 45/006* (2013.01)
USPC ........... 222/455; 222/454; 222/442; 264/250; 264/328.1; 264/328.7

(58) Field of Classification Search
CPC ...... B65D 47/06; B65D 47/08; G01F 11/261; G01F 11/262; G01F 11/26
USPC .................. 222/455, 454, 456, 442; 264/250, 264/328.1, 328.7
See application file for complete search history.

(56) References Cited

U.S. PATENT DOCUMENTS 1,962,562 A * 6/1934 Hemman ....................... 222/173
2,899,115 A * 8/1959 Matter .......................... 222/455
(Continued)

FOREIGN PATENT DOCUMENTS

EP  1 923 676 A1   5/2008
FR  2 548 142      6/1983
(Continued)

OTHER PUBLICATIONS

PCT Search Report for PCT Serial No. PCT/DK2011/000039 dated Oct. 20, 2011.
(Continued)

*Primary Examiner* — Kevin P Shaver
*Assistant Examiner* — Nicholas J Weiss
(74) *Attorney, Agent, or Firm* — McCormick, Paulding & Huber LLP

(57) ABSTRACT

A dispensing device for dispensing a liquid product from a container containing said product comprises a first chamber and a second chamber. An inlet passage comprising at least one inlet opening establishes a fluid connection between the first chamber and an interior part of a container having the dispensing device mounted thereon. An outlet passage adapted to deliver liquid product being dispensed by way of the dispensing device is fluidly connected to the second chamber. An intermediate wall divides an interior part of the dispensing device into the first chamber and the second chamber. The intermediate wall defines an edge, and the intermediate wall is arranged in such a manner that an intermediate passage between the first chamber and the second chamber is defined at said edge. The intermediate wall is provided with a recess formed in a surface facing the second chamber, said recess extending along at least a part of said surface in such a manner that an end part of the recess is arranged at the edge of the intermediate wall.

18 Claims, 5 Drawing Sheets

(56) References Cited

U.S. PATENT DOCUMENTS

| | | | |
|---|---|---|---|
| 4,061,253 A | | 12/1977 | Rockefeller |
| 5,029,736 A | * | 7/1991 | Maruyama et al. ............ 222/455 |
| 5,148,953 A | * | 9/1992 | Fudalla .......................... 222/442 |
| 5,480,071 A | * | 1/1996 | Santagiuliana ................ 222/455 |
| 5,495,964 A | * | 3/1996 | Santagiuliana ................ 222/455 |
| 7,032,788 B2 | * | 4/2006 | Moreau et al. ................. 222/455 |
| 2009/0159620 A1 | | 6/2009 | Nielsen |
| 2013/0062370 A1 | | 3/2013 | Nielsen |

FOREIGN PATENT DOCUMENTS

| | | |
|---|---|---|
| GB | 2 145 061 A | 3/1985 |
| WO | 93/16358 A1 | 8/1993 |
| WO | 94/10541 A1 | 5/1994 |
| WO | 2009/076959 A1 | 6/2009 |

OTHER PUBLICATIONS

PCT Search Report for PCT Serial No. PCT/DK2011/000040 dated Oct. 20, 2011.

* cited by examiner

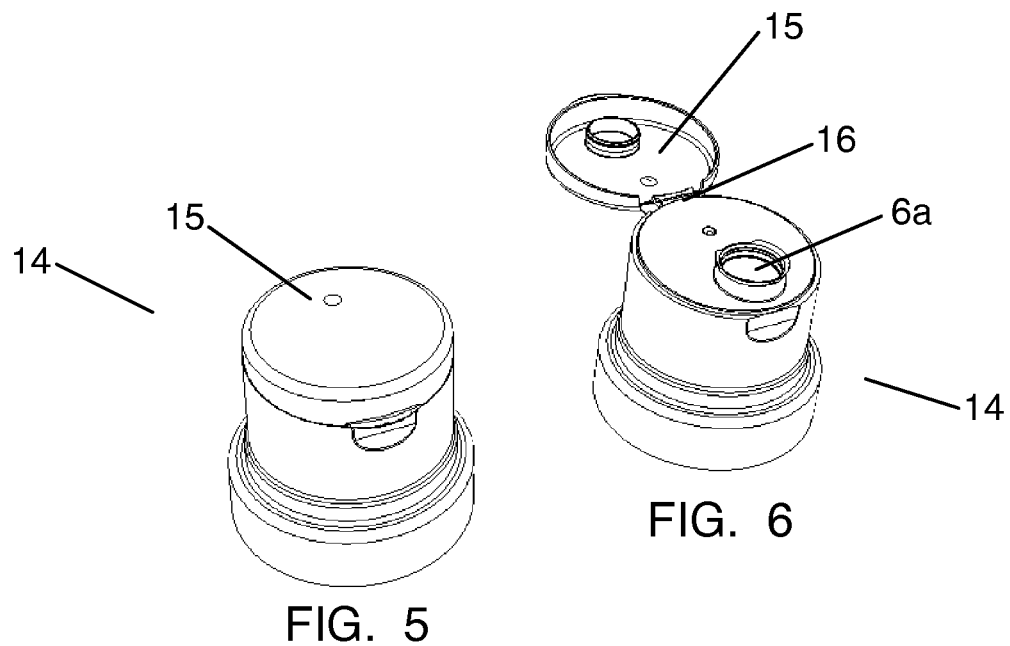
FIG. 5
FIG. 6
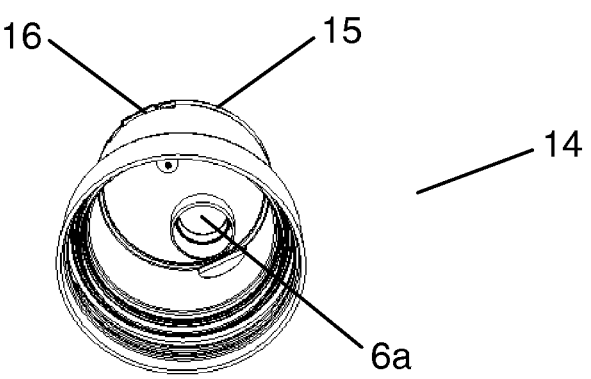
FIG. 7

DISPENSING DEVICE FOR DISPENSING A LIQUID PRODUCT

CROSS REFERENCE TO RELATED APPLICATIONS

This application is entitled to the benefit of and incorporates by reference essential subject matter disclosed in International Patent Application No. PCT/DK2011/000039 filed on May 3, 2011 and Danish Patent Application No. PA 2010 00392 filed May 5, 2010.

FIELD OF THE INVENTION

The present invention relates to a dispensing device for dispensing a liquid product, such as cleaning materials, detergents, softeners, liquid toilet soap, shampoo, medicine, etc., from a container containing the liquid product. More particularly, the present invention relates to a liquid dispenser being capable of delivering consistently precise doses of liquid product, which efficiently prevents that liquid product can be poured directly out of the container, bypassing the dispensing device, and in which splashing or 'gurgling' of the liquid during dispensing is minimised.

BACKGROUND OF THE INVENTION

WO 2009/076959 A1 discloses a dispensing device for dispensing doses of liquid medium. The dispensing device comprises a first chamber and a second chamber divided from each other by an intermediate wall arranged in an interior part of the dispensing device. An inlet passage establishes a fluid connection between the first chamber and an interior part of a container containing the liquid product, and an outlet passage allows liquid product to be dispensed from the second chamber. An intermediate passage is defined at a position of an edge of the intermediate wall, thereby allowing a dose of liquid product to pass from the first chamber to the second chamber. The intermediate wall comprises a portion which is inclined or curved in a direction towards the first chamber. Thereby the first chamber defines a cavity or bowl-shaped region which traps liquid product when the dispensing device is oriented in a certain direction during a dispensing movement. This prevents liquid product from passing directly through the dispensing device.

One disadvantage of the dispensing device of WO 2009/076959 is that there is a risk that a vacuum is formed in the container during dispensing, and that such vacuum can result in errors in the doses being dispensed by means of the dispensing device.

SUMMARY OF THE INVENTION

It is an object of embodiments of the invention to provide a dispensing device for dispensing liquid product which is capable of dispensing doses of liquid product in a more precise manner than prior art dispensing devices.

It is a further object of embodiments of the invention to provide a dispensing device for dispensing liquid product which is capable of preventing that liquid product is dispensed directly through the dispenser.

According to a first aspect the invention provides a dispensing device for dispensing a liquid product from a container containing said product, the dispensing device comprising:

a first chamber and a second chamber, an inlet passage comprising at least one inlet opening and establishing a fluid connection between the first chamber and an interior part of a container having the dispensing device mounted thereon, an outlet passage adapted to deliver liquid product being dispensed by means of the dispensing device, said outlet passage being fluidly connected to the second chamber, an intermediate wall dividing an interior part of the dispensing device into the first chamber and the second chamber, the intermediate wall defining an edge, the intermediate wall being arranged in such a manner that an intermediate passage between the first chamber and the second chamber is defined at said edge, and the intermediate wall being provided with a recess formed in a surface facing the second chamber, said recess extending along at least a part of said surface in such a manner that an end part of the recess is arranged at the edge of the intermediate wall.

The dispensing device according to the invention is adapted to dispense liquid products, such as cleaning materials, liquid detergents, softeners, liquid soap, shampoo, or any other suitable kind of liquid product which it is desirable to dispense from a container containing the product. The dispensing device according to the invention is further capable of dispensing a metered dose of liquid product. This will be explained further below.

The inlet passage establishes a fluid connection between the first chamber and an interior part of a container having the dispensing device mounted thereon. Thus, when the dispensing device is mounted on a container, liquid product is allowed to pass from the interior of the container into the first chamber, and thereby into the dispensing device, via the inlet passage. Accordingly, when liquid product is dispensed from the container by means of the dispensing device, liquid product from the container first enters the dispensing device by entering the first chamber.

The outlet passage is fluidly connected to the second chamber, and it is adapted to deliver liquid product being dispensed by means of the dispensing device. Accordingly, when liquid product is dispensed by means of the dispensing device, it leaves the dispensing device from the second chamber and via the outlet passage.

The intermediate wall divides an interior part of the dispensing device into the first chamber and the second chamber. Accordingly, one surface of the intermediate wall faces the first chamber and another surface of the intermediate wall faces the second chamber. The intermediate wall may be solid in the sense that no cavities, channels or the like are defined inside the intermediate wall. In this case the intermediate wall is preferable thin, e.g. having a sheet-like structure. As an alternative, the intermediate wall may contain one or more hollow part, e.g. in the form of one or more cavities and/or one or more channels.

The intermediate wall defines an edge, preferably in the form of a free end of the intermediate wall. The intermediate wall is arranged in the interior of the dispensing device in such a manner that an intermediate passage between the first chamber and the second chamber is defined at the edge. Accordingly, liquid product which has entered into the first chamber from the container containing the liquid product is allowed to pass into the second chamber, via the intermediate passage. Subsequently, the liquid product can be delivered from the second chamber, via the outlet passage. In summary, liquid product being dispensed by means of the dispensing device follows a fluid path from the container, through the inlet passage into the first chamber, through the intermediate passage into the second chamber and out of the dispensing device via the outlet passage.

The intermediate wall is provided with a recess formed in a surface facing the second chamber. The recess may, e.g., be in the form of a groove or a channel formed in the surface. The recess extends along at least a part of the surface in such a manner that an end part of the recess is arranged at the edge of the intermediate wall. Thereby the recess communicates with the intermediate passage defined at the edge of the intermediate wall, and the recess thereby establishes a channel inside the second chamber, the channel leading to the intermediate passage. This channel allows air to flow into the first chamber, via the outlet passage, the second chamber and the intermediate passage, during dispensing of liquid, without being disturbed by the outbound liquid flow. Thereby it is prevented that a vacuum is formed in the first chamber or in the container containing the liquid and having the dispensing device mounted thereon. As mentioned above, such a vacuum can result in errors in the dispensed dose, and preventing the formation of a vacuum therefore allows a more precise dose to be dispensed. Furthermore, the precision in the dispensed dose is very reliable in the sense that it can be trusted that the dispensed dose is the same each time the dispensing device is operated.

The dispensing device of the present invention may advantageously be operated in the following manner. The dispensing device is mounted at an opening of a container containing liquid product to be dispensed by means of the dispensing device. Alternatively, the dispensing device may form an integral part of the opening of the container. The opening is normally arranged at a part of the container which is directed upwards when the container serves storage purposes only, i.e. when liquid product is not being dispensed. Thus, in this situation the liquid product in the container is not in contact with the opening, and thereby with the dispensing device.

When it is desired to dispense a dose of liquid product from the container, the container is tipped, and the dispensing device is tipped along, in such a manner that the first chamber moves towards a position above the position of the second chamber. This tipping movement causes liquid product from the container to enter the first chamber via the inlet passage. The container is then tipped back to an upright position. During this movement the liquid product which has previously entered the first chamber is allowed to pass into the intermediate passage. The dispensing device may be designed in such a manner that the volume of the liquid product trapped in the first chamber exceeds the volume of the intermediate passage. In this case excess liquid product is preferably returned to the interior part of the container via the inlet passage when the container is tipped back to the upright position. As an alternative, the dispensing device may be designed in such a way that the volume of the first chamber is smaller than the volume of the intermediate passage. In this case the intermediate passage is not completely filled when liquid product is passed from the first chamber to the intermediate passage. In any event, the amount of liquid product contained in the intermediate passage constitutes a dose of liquid product, and the size of the dose is defined by the smaller of the volume of the first chamber and the volume defined by the intermediate passage.

Subsequently the container, and thereby also the dispensing device, is once again tipped in such a manner that the first chamber moves towards a position above the position of the second chamber. Thereby the liquid product contained in the intermediate passage moves into the second chamber, and onwards out of the dispensing device via the outlet passage. Simultaneously, a new amount of liquid product enters the first chamber via the inlet opening as described above, and the dispensing device is thereby ready to deliver a dose of liquid product the next time the container is tipped. Accordingly, each time the container is tipped as described above, a precise dose of liquid product is dispensed from the container, the size of the dose being determined by a volumes of the first chamber and the intermediate passage as described above.

While a dose of liquid product passes through the second chamber from the intermediate passage towards the outlet passage, air is allowed to move in an opposite direction via the channel defined by the recess formed in the surface of the intermediate wall. Thereby it is prevented that a vacuum is formed inside the dispensing device, and a more precise dose of liquid can be delivered as described above.

At least part of the recess in the intermediate wall may extend substantially along a flow direction of liquid being dispensed from the second chamber. According to this embodiment, the air flow flowing in the recess in the intermediate wall flows along a direction which is substantially opposite to the flow direction of the liquid product flowing towards the outlet passage in the second chamber. This makes it very easy for the air to flow towards the intermediate passage and prevent the formation of a vacuum.

The intermediate wall may be positioned in such a manner that at least a portion of the intermediate wall is inclined and/or curved towards the first chamber, and relatively to a longitudinal direction of the dispensing device. According to this embodiment, the intermediate wall and the first chamber in combination form a 'bowl shaped' part which can trap liquid product in the first chamber during dispensing of a dose of liquid product. This is because the inclination and/or the curvature of the intermediate wall ensures that when the dispensing device is tipped along with the container containing the liquid product, at a certain point the edge of the intermediate wall is positioned higher than any other part of the intermediate wall. Thus, gravity prevents liquid product from passing into the second chamber, via the intermediate passage, when this point is reached, and thereby the liquid product is trapped inside the first chamber until the container and the dispensing device are returned to the upright position. This helps in ensuring that the dose dispensed by the dispensing device is precise. It further helps in preventing liquid product from passing directly through the dispensing device.

The dispensing device may further comprise a first delimiting wall delimiting the second chamber towards an interior part of a container having the dispensing device mounted thereon, and a second delimiting wall delimiting at least the first chamber, the second delimiting wall being arranged substantially opposite the first delimiting wall. The first delimiting wall prevents liquid product from passing directly from the container into the second chamber. Thus, the only passage into the dispensing device is the inlet passage, leading into the first chamber. Similarly, the second delimiting wall delimits the first chamber, thereby preventing that liquid product can leave the first chamber in any other way than through the intermediate passage. Thus, the liquid product is forced to follow the strict flow path through the dispensing device which is described above. Thereby the dose being delivered by the dispensing device can be controlled precisely.

The intermediate wall may extend from the second delimiting wall towards the first delimiting wall, the edge of the intermediate wall being arranged with a distance to the first delimiting wall. According to this embodiment, the intermediate wall is attached to the second delimiting wall, or it is arranged in tight abutment to the second delimiting wall, thereby preventing that liquid passes between the first chamber and the second chamber along the second delimiting wall. On the other hand, the intermediate wall is arranged with a distance to the first delimiting wall. Thereby the intermediate passage is formed between the edge of the intermediate wall and the first delimiting wall.

The dispensing device may comprise a first part and a second part, and the intermediate wall may form part of the first part and the second delimiting wall may form part of the second part. Forming the dispensing device from two separate parts makes it easier to manufacture the dispensing device by means of injection moulding, because it is thereby possible to mould the interior parts, such as the intermediate wall, directly along with the dispensing device. This is very advantageous, since injection moulding is an easy and cost efficient manufacturing method. Furthermore, one of the parts may be sized and shaped in such a manner that it fits with several other parts. Thereby it is possible to manufacture various dispensing devices, e.g. delivering various doses of liquid product, using the same manufacturing tools. For instance, the first part may be an insert part adapted to be inserted into the container, e.g. into a bottle neck, and the second part may be a top part adapted to be arranged primarily outside the container.

The first delimiting wall may be in the form of a separate part mounted onto the dispensing device. According to this embodiment, it is also possible to manufacture the dispensing device by means of injection moulding, since the first delimiting wall does not have to be moulded along with the rest of the dispensing device. Thereby it is possible to mould the interior parts of the dispensing device directly along with the rest of the dispensing device. Furthermore, the position of the first delimiting wall may in some cases define the volume of the dispensed dose. Thus, when the first delimiting wall is manufactured separately and mounted onto the dispensing device, the size of the dispensing device may be adjusted in order to obtain a desired dose, prior to mounting the first delimiting wall. This makes it possible to manufacture dispensing devices adapted to deliver various doses of liquid product, using the same manufacturing equipment. This allows the manufacturer to offer a variety of different dispensing devices at minimal manufacturing costs.

The first delimiting wall may be mounted onto the dispensing device by means of any suitable technique, such as welding, gluing, heat treatment, etc., depending of the material of the dispensing device.

The dispensing device may further comprise an inlet surface arranged adjacent to the inlet passage. The inlet surface is preferable arranged in such a manner that liquid product flows along the inlet surface when entering the first chamber via the inlet opening.

The inlet surface may be arranged in such a manner relative to the intermediate wall that when the inlet surface and the intermediate wall are projected onto a plane arranged substantially perpendicularly to a longitudinal direction of the dispensing device, an overlap is defined between the projections or the projection of the edge of the intermediate wall substantially abuts the projection of an edge of the inlet surface. Thereby no direct passage exists from the inlet opening to the intermediate passage, and it is thereby prevented that liquid product can pass through the dispensing device without being dosed. It is preferred that the projections are arranged in such a manner that the projection of the edge of the intermediate wall and the projection of an edge of the inlet surface substantially abut, since this allows the dispensing device or a part of the dispensing device comprising the intermediate wall and the inlet wall to be manufactured by means of injection moulding. It should be noted that the term 'substantially abut' should be interpreted to mean situations where the edges are precisely aligned, as well as situations where a small overlap or a small gap is present at the position of the edges.

The inlet surface may be inclined relative to a longitudinal direction of the dispensing device. In this case the liquid product can flow along the inlet surface, i.e. be guided by the inlet surface when entering the first chamber via the inlet opening. Thereby a smooth flow of liquid product into the first chamber is provided, rather than a 'splashy' flow. The inlet surface may preferably be inclined in such a manner that when the container is positioned in an upright position normally used for storage purposes, the inlet surface defines an up-going slope from the interior of the container towards the inlet passage. This will allow the liquid product to flow along the inlet surface when being dispensed, as described above. Furthermore, when the container is positioned in the upright position after dispensing has been completed, any liquid product present on the inlet surface will be returned to the interior of the container.

The inclination of the inlet surface may be between 30° and 60°, such as between 40° and 50°, such as approximately 45°.

At least a part of the inlet passage may be arranged adjacent to an upper rim of a container having the dispensing device mounted thereon. This prevents that liquid product is trapped between the top of the container and the dispensing device. Thereby it is possible to dispense the last drops of liquid product in the container, i.e. the waste of liquid product is minimised. The entire inlet passage may be arranged adjacent to the upper rim of the container. As an alternative, only a part of the inlet passage may be arranged in this manner, the remaining parts of the inlet passage being arranged further away from the rim of the container. In this case the part or parts arranged adjacent to the rim may, e.g., be in the form of separate holes or openings, or in the form of grooves or cuts formed in a larger inlet passage.

The dispensing device may further comprise at least one dividing wall arranged to divide the inlet passage into at least two separate portions. According to this embodiment, the liquid flow into the first chamber, via the inlet passage, is divided into two or more flows. This helps in preventing splashing or gurgling of the liquid product.

The dividing wall may further provide stiffness to the construction, thereby ensuring that the dispensing device can be arranged in a fluid tight manner in an opening of a container containing liquid product.

The present invention further relates to a container for containing a liquid product, the container having a dispensing device according to the first aspect of the invention mounted thereon. The dispensing device may either be a separate part which is mounted onto the container, or it may form an integral part of the container.

According to a second aspect the invention provides a method for manufacturing a dispensing device according to the first aspect of the invention, the method comprising the step of injection moulding at least a part of the dispensing device.

It should be noted that a person skilled in the art would readily recognise that any feature described in combination with the first aspect of the invention could also be combined with the second aspect of the invention, and vice versa.

The method may further comprise the step of mounting a first delimiting wall on the dispensing device. As described above, this makes it easy to directly form the interior parts of the dispensing device, such as the intermediate wall, by means of injection moulding. Furthermore, the position of the first delimiting wall may determine the dose being delivered by the dispensing device, and mounting the first delimiting wall separately may therefore allow for an adjustment of the dose to be delivered by the dispensing device. The first delimiting wall may be mounted using any suitable technique, such as welding, gluing or heat treatment.

The method may comprise the steps of:
injection moulding a first part of the dispensing device in such a manner that an intermediate wall is formed,
injection moulding a second part of the dispensing device in such a manner that a second delimiting wall is formed, and
assembling the first part and the second part.

As described above, this allows various dispensing devices to be manufactured using the same moulding equipment.

The method may further comprise the steps of:
selecting a dosage to be dispensed by the resulting dispensing device,
calculating at least one dimension of the dispensing device in such a manner that said dimension(s) provide(s) the selected dosage,
adjusting injection moulding equipment in accordance with the calculated dimension(s), and
injection moulding at least a part of the dispensing device using the adjusted injection moulding equipment.

According to this embodiment, dispensing devices adapted to deliver various doses of liquid product can be manufactured using the same moulding equipment.

The at least one dimension(s) may include a distance between the edge of the intermediate wall and the position of a first delimiting wall. This distance may define the amount of liquid product it is possible to store in the intermediate passage, and thereby the dose being dispensed by the dispensing device. Accordingly, the dose delivered by the resulting dispensing device may be adjusted merely by adjusting a single parameter, e.g. a length of the dispensing device. Afterwards, a first delimiting wall may be mounted as described above.

As an alternative, the dispensing devices may be injection moulded with equal lengths, and the length may subsequently be adjusted by removing material before a first delimiting wall is mounted. However, during this process material is wasted. Furthermore, it may be difficult to remove the excess material in a manner which provides a smooth edge for mounting the first delimiting wall.

BRIEF DESCRIPTION OF THE DRAWINGS

The invention will now be described in further detail with reference to the accompanying drawings in which FIG. 5-7 are perspective views of a second part of a dispensing device according to an embodiment of the invention, seen from three different angles.

DETAILED DESCRIPTION

Figure 1:
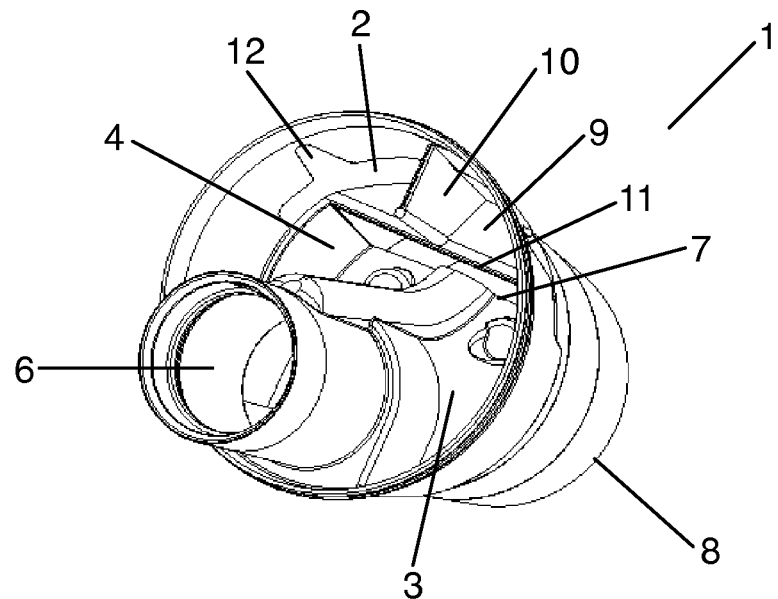
FIGS. 1-4 are perspective views of a first part of a dispensing device according to an embodiment of the invention, seen from four different angles.
Figure 2:
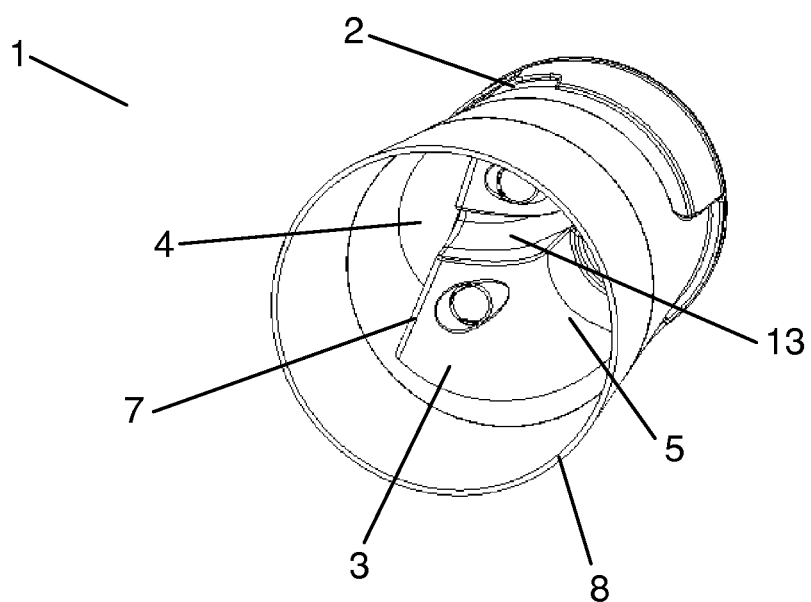
Figure 3:
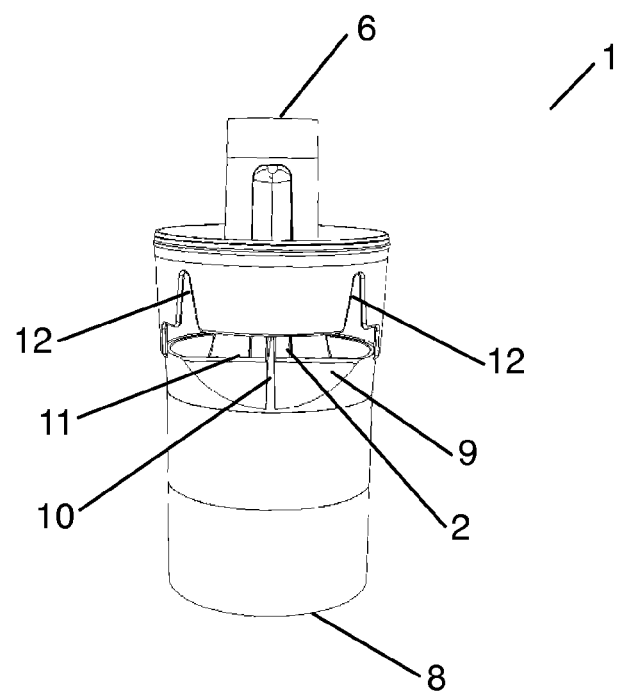
Figure 4:
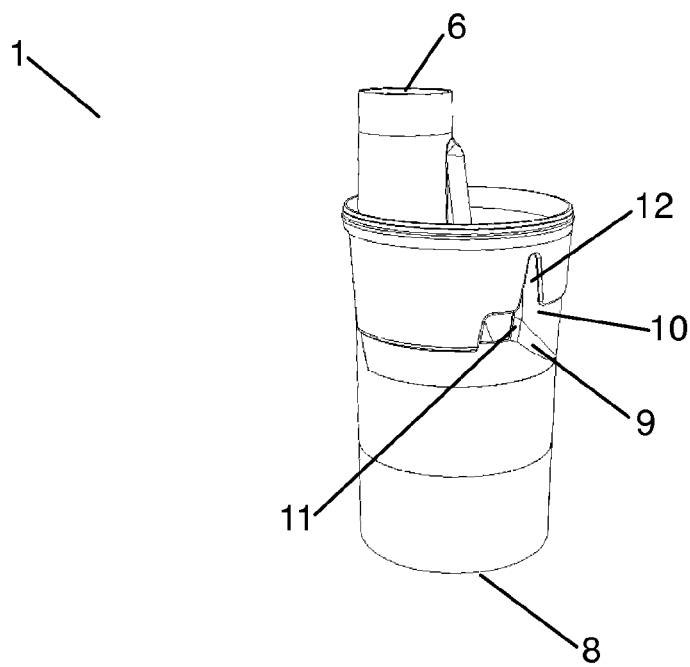

FIGS. 1-4 are perspective views of a first part 1 of a dispensing device according to an embodiment of the invention. FIG. 1 is a top view of the first part 1, FIG. 2 is a view from below, FIG. 3 is a side view through an inlet passage 2, and FIG. 4 is a side view substantially perpendicular to the view of FIG. 3.

An intermediate wall 3 is arranged in the interior parts of the first part 1, dividing the interior of the first part 1 into a first chamber 4 and a second chamber 5. The second chamber 5 is fluidly connected to an outlet passage 6 adapted to deliver liquid product being dispensed by the dispensing device. The first chamber 4 is fluidly connected to the inlet passage 2. When the dispensing device is mounted on a container containing liquid product, the inlet passage 2 is furthermore fluidly connected to the interior of the container. Thereby liquid product from the container is allowed to enter the first chamber 4 via the inlet passage 2.

The intermediate wall 3 defines an edge 7 which is arranged at a distance from a lower rim 8 of the first part 1. Thereby an intermediate passage is defined between the edge 7 and the lower rim 8, the intermediate passage allowing liquid product to pass from the first chamber 4 to the second chamber 5 during dispensing of liquid product.

During storage, i.e. when a dose of liquid product is not being dispensed by the dispenser, the dispenser is normally orientated in such a manner that the outlet passage 6 faces upwards.

When it is desired to dispense a dose of liquid product, the dispensing device is tipped in a direction which moves the first chamber 4 towards a position above the second chamber 5. Thereby liquid product enters the first chamber 4 via the inlet passage 2. During this, the liquid product flows along inlet surface 9. Inlet surface 9 is inclined, thereby providing a smooth flow of the liquid product, rather than a 'splashy' flow. Furthermore, the flow of liquid product is 'broken' by dividing wall 10, which further helps in providing a smooth flow of liquid product through the inlet passage 2.

The inlet passage 2 is provided with two grooves 12 extending towards an upper part of the first part 1. When the dispensing device is mounted on a container containing liquid product to be dispensed, the grooves 12 will be arranged near an upper edge of the container. Thereby it is prevented that liquid product is trapped between the container and the dispensing device. This is an advantage when only a small volume of liquid product remains in the container, since the grooves 12 in this case ensure that the remaining volume of liquid product is allowed to enter the first chamber 4 via the grooves 12, rather than being trapped, in which case the trapped volume would have to be left in the container, i.e. the liquid product contained in the container could not be fully dispensed.

Then the dispensing device is once again moved to the upright position, i.e. to the position where the outlet passage 6 is facing upwards. Thereby the liquid product which has previously entered the first chamber 4 moves towards the intermediate passage defined at the edge 7 of the intermediate wall 3, and thereby enters the second chamber 5. The intermediate wall 3 is curved in a direction towards the first chamber 4 in such a manner that when the intermediate wall 3 and the inlet surface 9 are projected onto a plane which is substantially perpendicular to a longitudinal direction of the dispensing device, then the edge 7 of the intermediate wall 3 and an edge 11 of the inlet surface 9 are arranged substantially in abutment. This prevents liquid product from passing directly from the inlet passage 2 to the intermediate passage defined at the edge 7 of the intermediate wall 3, thereby ensuring that liquid product passing through the dispensing device is properly dosed.

Next, the dispensing device is once again tipped in the manner described above. This causes the liquid product which has entered into the second chamber 5 to move towards the outlet passage 6, and the liquid product is thereby dispensed from the dispensing device, via the outlet passage 6. Simultaneously, a new dose of liquid product enters the first chamber 4 via the inlet passage 2 as described above, and the dispensing device is thereby immediately ready for dispensing a new dose of liquid product. As the liquid product flows in the second chamber 5 towards the outlet passage 6, air is flowing in a direction towards the edge 7 of the intermediate wall 3, via recess 13. This prevents that a vacuum is formed inside the dispensing device during dispensing of a dose of liquid product, and it is thereby ensured that the dose of liquid product being dispensed by the dispensing device is precise and consistent.

The volume of the dose of liquid product being dispensed is determined by a combination of the volume defined by the first chamber 4, i.e. the amount of liquid product which the first chamber 4 holds when the dispensing device is initially tipped, and the volume defined by the intermediate passage, i.e. the amount of liquid product which can be contained between the edge 7 of the intermediate wall 3 and the lower rim 8 of the first part 1. Accordingly, it is possible, at least to some extent, to adjust the dose of liquid product to be dispensed by the dispensing device by adjusting the length of the dispensing device, i.e. by adjusting the position of the lower rim 8. This may, e.g., be done by removing material, i.e. shortening the first part 1, or by adjusting the manufacturing tool used for manufacturing the first part 1 in a manner which adjusts the length of the first part 1 to match the desired dose.

FIGS. 5-7 are perspective views of a second part 14 of a dispensing device according to an embodiment of the invention. The second part 14 of FIGS. 5-7 may advantageously be assembled with the first part 1 shown in FIGS. 1-4, thereby forming a dispensing device.

The second part 14 is provided with a lid 15 which is connected to the remaining part of the second part 14 by means of a hinge 16. An outlet passage 6a may be arranged in fluid communication with outlet passage 6 of the first part 1 of FIGS. 1-4, thereby allowing liquid product to be dispensed through the second part 14. The lid 15 may be in an open position, as shown in FIG. 6, allowing liquid product to be delivered, or in a closed position, as shown in FIGS. 5 and 7, preventing liquid product from being delivered.

Figure 8:
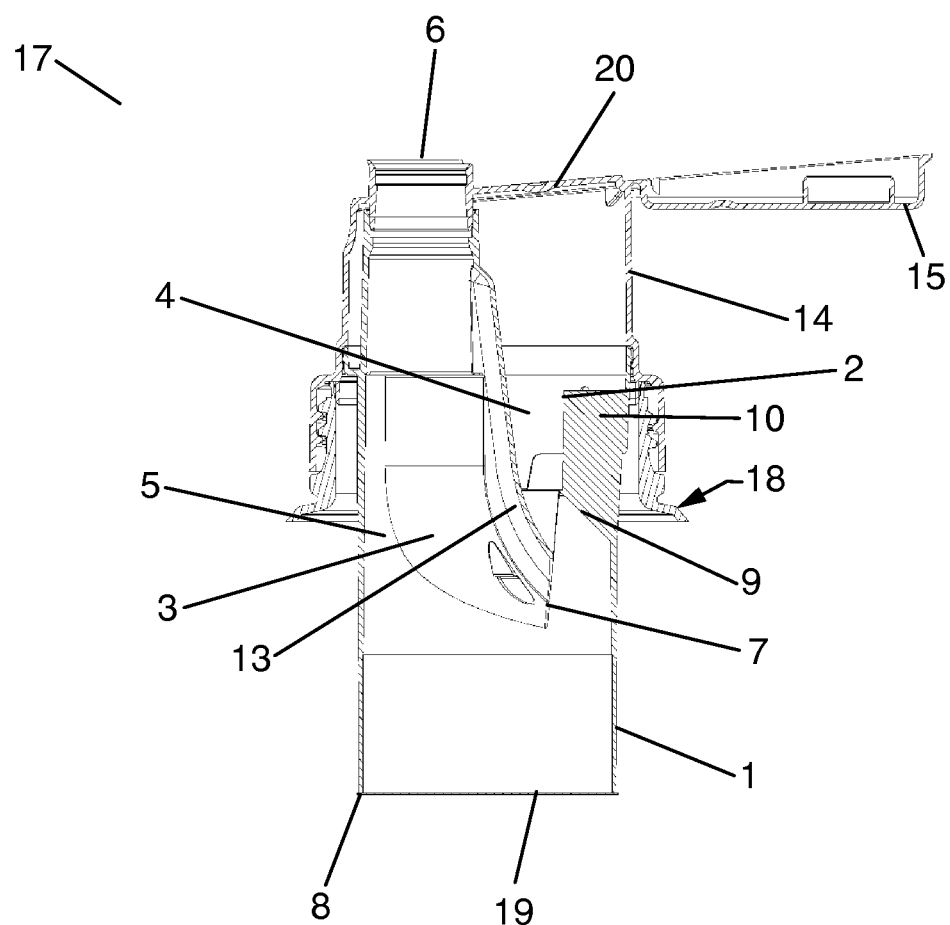
FIG. 8 is a cross sectional view of a dispensing device according to an embodiment of the invention, the dispensing device comprising the first part of FIGS. 1-4 and the second part of FIGS. 5-7.

FIG. 8 is a cross sectional view of a dispensing device 17 comprising the first part 1 of FIGS. 1-4 and the second part 14 of FIGS. 5-7. The dispensing device 17 is mounted on a bottle neck 18, the bottle containing liquid product to be dispensed.

A first delimiting wall 19 has been mounted on the lower rim 8 of the first part 1, the first delimiting wall 19 delimiting the second chamber 5 towards the interior parts of the container. A second delimiting wall 20 is defined by the second part 14, the second delimiting wall 20 delimiting the first chamber 4 towards the exterior of the dispensing device 17.

Figure 9:
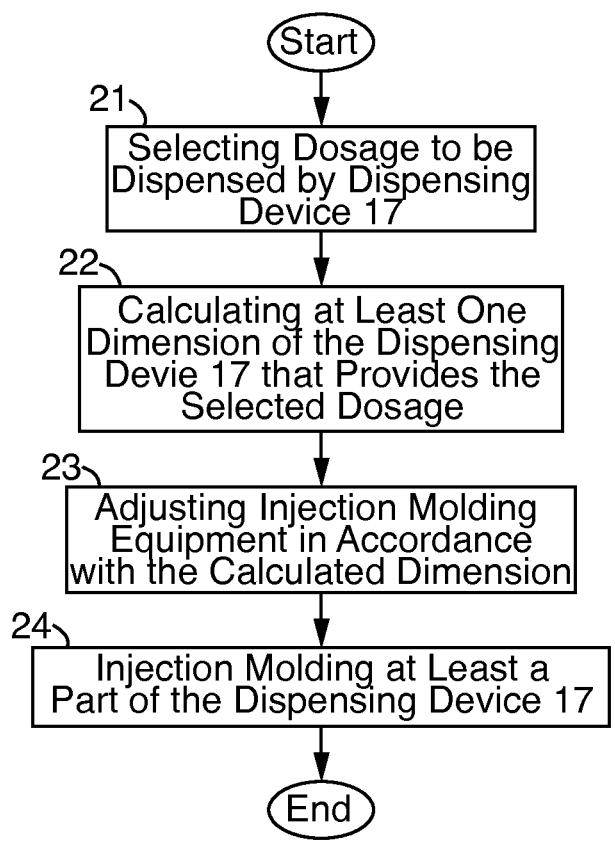
FIG. 9 is a flow diagram of a method for manufacturing at least a part of the dispensing device of FIG. 8 according to an embodiment.

Referring to FIG. 9, a method for manufacturing at least a part of the dispensing device 17 is shown. The method comprises selecting a dosage to be dispensed by the resulting dispensing device 17 at step 21. At step 22, the method includes calculating at least one dimension of the dispensing device 17 in such a manner that said dimension(s) provide(s) the selected dosage. The method further comprises adjusting injection moulding equipment in accordance with the calculated dimension(s) at step 23 and injection moulding at least a part of the dispensing device 17 using the adjusted injection moulding equipment at step 24. Accordingly, as discussed above, it is possible, at least to some extent, to adjust the dose of liquid product to be dispensed by the dispensing device 17 by adjusting the length of the dispensing device, i.e. by adjusting the position of the lower rim 8, shown in FIG. 8. This may, e.g., be done by removing material, i.e. shortening the first part 1, shown in FIG. 8, or by adjusting the manufacturing tool used for manufacturing the first part 1, shown in FIG. 8, in a manner which adjusts the length of the first part 1, shown in FIG. 8, to match the desired dose.

Although various embodiments of the present invention have been described and shown, the invention is not restricted thereto, but may also be embodied in other ways within the scope of the subject-matter defined in the following claims.

What is claimed is:

1. A dispensing device for dispensing a liquid product from a container containing said product, the dispensing device comprising:
   a first chamber and a second chamber,
   an inlet passage comprising at least one inlet opening and establishing a fluid connection between the first chamber and an interior part of a container having the dispensing device mounted thereon,
   an outlet passage adapted to deliver liquid product from the dispensing device, said outlet passage being fluidly connected to the second chamber,
   an intermediate wall dividing an interior part of the dispensing device into the first chamber and the second chamber, the intermediate wall defining an edge, the intermediate wall being arranged in such a manner that an intermediate passage between the first chamber and the second chamber is defined at said edge,
   wherein the intermediate wall is provided with a groove formed in a surface facing the second chamber, said groove extending along at least a part of said surface in such a manner that an end of the groove is arranged at the edge of the intermediate wall, the groove thereby establishing a channel extending along at least a part of the intermediate wall inside the second chamber, the channel leading to the intermediate passage.

2. The dispensing device according to claim 1, wherein at least part of the groove in the intermediate wall extends substantially along a flow direction of liquid being dispensed from the second chamber.

3. The dispensing device according to claim 1, wherein the intermediate wall is positioned in such a manner that at least a portion of the intermediate wall is inclined and/or curved towards the first chamber, and relative to a longitudinal direction of the dispensing device.

4. The dispensing device according to claim 1, further comprising a first delimiting wall delimiting the second chamber towards an interior part of a container having the dispensing device mounted thereon, and a second delimiting wall delimiting at least the first chamber, the second delimiting wall being arranged substantially opposite the first delimiting wall.

5. The dispensing device according to claim 4, wherein the intermediate wall extends from the second delimiting wall towards the first delimiting wall, the edge of the intermediate wall being arranged with a distance to the first delimiting wall.

6. The dispensing device according to claim 4, the dispensing device comprising a first part and a second part, wherein the intermediate wall forms part of the first part and the second delimiting wall forms part of the second part.

7. The dispensing device according to claim 4, wherein the first delimiting wall is in the form of a separate part mounted onto the dispensing device.

8. The dispensing device according to claim 1, further comprising an inlet surface arranged adjacent to the inlet passage.

9. The dispensing device according to claim 8, wherein the inlet surface is arranged in such a manner relative to the intermediate wall that when the inlet surface and the intermediate wall are projected in a longitudinal direction of the dispensing device onto a plane arranged substantially perpendicularly to the longitudinal direction of the dispensing device, an overlap is defined between the projections or the projection of the edge of the intermediate wall substantially abuts the projection of an edge of the inlet surface.

10. The dispensing device according to claim 8, wherein the inlet surface is inclined relative to a longitudinal direction of the dispensing device.

11. The dispensing device according to claim 1, wherein at least a part of the inlet passage is arranged adjacent to an upper rim of a container having the dispensing device mounted thereon.

12. The dispensing device according to claim 1, further comprising at least one dividing wall arranged to divide the inlet passage into at least two separate portions.

13. A container for containing a liquid product, the container having a dispensing device according to claim 1 mounted thereon.

14. A method for manufacturing a dispensing device according to claim 1, wherein the method comprising the step of injection molding at least a part of the dispensing device.

15. The method according to claim 14, further comprising the step of mounting a first delimiting wall on the dispensing device.

16. The method according to claim 14, the method comprising the steps of:
   injection molding a first part of the dispensing device in such a manner that an intermediate wall is formed,
   injection molding a second part of the dispensing device in such a manner that a second delimiting wall is formed, and
   assembling the first part and the second part.

17. The method according to claim 14, further comprising the steps of:
   selecting a dosage to be dispensed by the resulting dispensing device,
   calculating at least one dimension of the dispensing device in such a manner that said dimension(s) provide(s) the selected dosage,
   adjusting injection molding equipment in accordance with the calculated dimension(s), and
   injection molding at least a part of the dispensing device using the adjusted injection moulding equipment.

18. The method according to claim 17, wherein the at least one dimension(s) includes a distance between the edge of the intermediate wall and the position of a first delimiting wall.

\* \* \* \* \*